March 9, 1954
G. A. LYON
2,671,695
WHEEL COVER
Filed Feb. 7, 1950
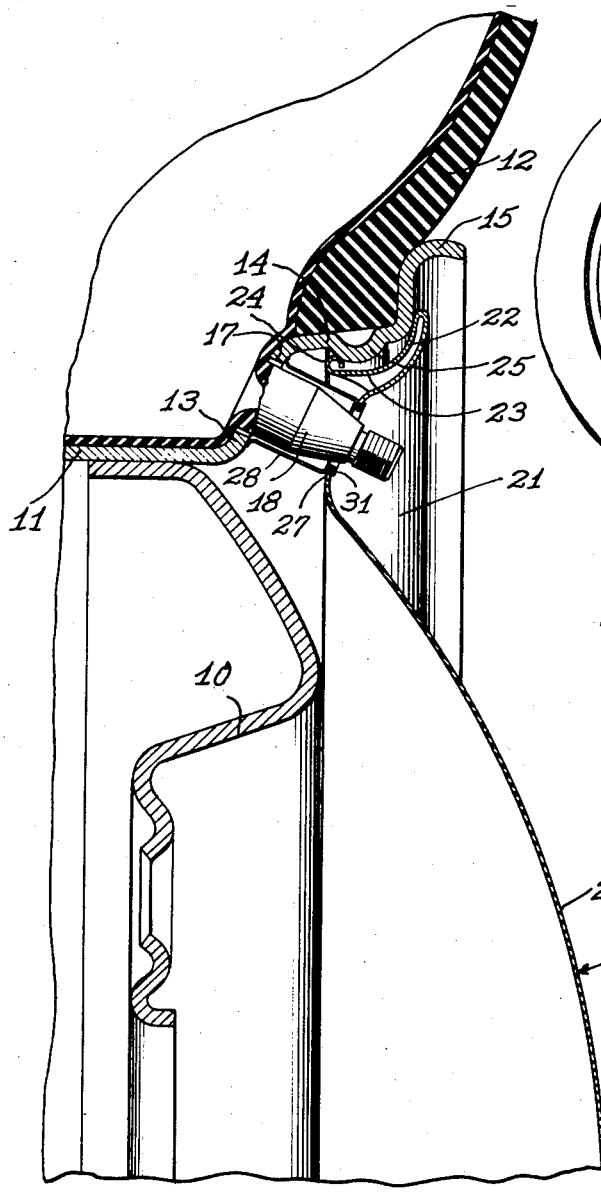
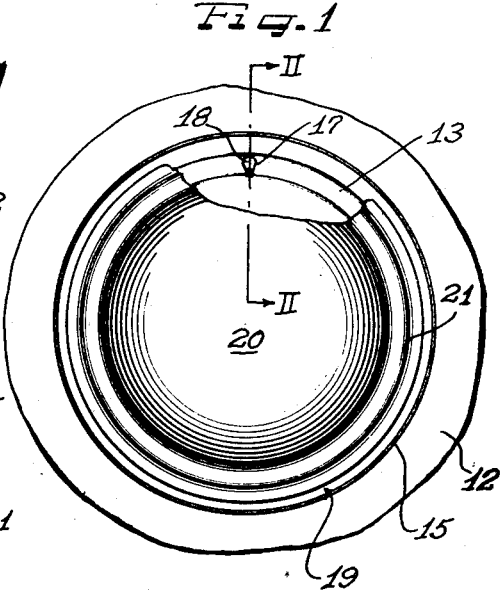
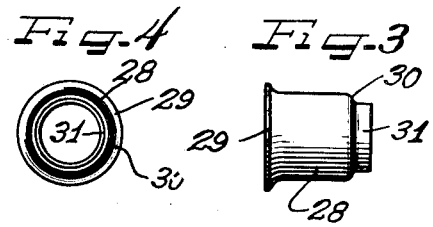
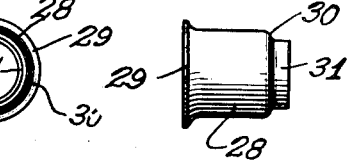
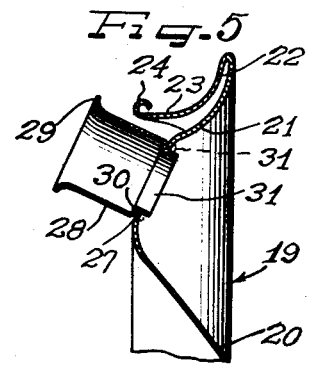
Inventor
GEORGE ALBERT LYON
by The Firm of Charles W. Hill
Attys.

Patented Mar. 9, 1954

2,671,695

UNITED STATES PATENT OFFICE 2,671,695

WHEEL COVER

George Albert Lyon, Detroit, Mich.

Application February 7, 1950, Serial No. 142,904

8 Claims. (Cl. 301—37)

1

The present invention relates to improvements in wheel structures and more particularly concerns the covering of the outer side of vehicle wheels for protection and ornamentation.

An important object of the present invention is to provide an improved wheel structure in which a wheel cover is retained on the wheel in a manner to prevent turning of the cover relative to the wheel in service.

Another object of the invention is to provide improved structure for preventing a wheel cover from turning on a vehicle wheel having a valve stem projecting through an aperture in the cover.

A further object of the invention is to provide an improved wheel cover for disposition at the outer side of the vehicle wheel and including novel means for cooperation with a valve stem to prevent turning of the cover relative to the wheel.

According to the general features of the present invention there is provided in a wheel structure including a multi-flange tire rim and a load sustaining body part, the tire rim supporting a pneumatic tire assembly and having a valve stem projecting outwardly therefrom, a cover for concealing the other side of the wheel and overlying the tire rim and having an aperture therethrough for passage of the valve stem, and a member secured to the cover at said aperture and arranged to engage with the valve stem adjacent to the base of the latter for holding the cover against turning relative to the wheel.

According to other general features of the invention there is provided in a cover for disposition at the outer side of a vehicle wheel and having an aperture therethrough for passage of a valve stem, a sleeve having a portion secured to the cover about the margin defining the valve stem aperture and extending behind the cover for engagement with the base of the valve stem to retain the cover against turning relative to a wheel upon which the cover may be mounted.

Among other features of the invention there is provided a sleeve for attachment to a wheel cover member having a valve stem aperture, a sleeve body having a bell-shaped end adapted for engagement about the base of a valve stem and a restricted opposite end affording a shoulder engageable against the inner side of the margin defining the aperture in the cover member and a neck to extend through the aperture and adapted to be upset into aperture-margin-gripping relation to said shoulder.

Other objects, features and advantages of the present invention will be readily apparent from the following detailed description of a preferred

2 embodiment thereof taken in conjunction with the accompanying drawings in which:

Figure 1 is a side elevational view of a vehicle wheel structure embodying the features of the invention, and with a portion of the wheel cover broken away to reveal structure therebehind;

Figure 2 is an enlarged radial sectional view taken substantially on the line II—II of Figure 1;

Figure 3 is side elevational view of the turn-preventing sleeve prior to assembly thereof with the cover;

Figure 4 is an end view of the sleeve looking at the small end thereof; and

Figure 5 is a radial sectional view through the marginal portion of the cover showing the sleeve in course of assembly with the cover.

As shown on the drawings:

The present invention is especially useful in conjunction with a vehicle wheel which may be of the current more or less standard construction including a wheel body 10 supporting a multi-flange tire rim 11 which in turn supports a pneumatic tire and tube assembly 12. The tire rim includes a side flange 13, an intermediate generally axially extending intermediate flange 14 and a terminal flange 15. The side flange 13 has a valve stem aperture 17 through which extends a valve stem 18 by which the tire assembly is inflated.

For protectively and ornamentally covering the outer side of the wheel, a cover 19 is provided which preferably comprises a full disk structure including a central crown portion 20 and a marginal portion 21 of generally dished cross-section and having a more or less ogee contour which is of a radially outward extent to substantially overlie the tire rim 11.

For retaining the cover 19 on the wheel, the outer margin of the cover is equipped with suitable retaining means herein shown as comprising integral generally radially inwardly underturned marginal flange structure 22 having at the inner portion thereof generally axially inwardly extending cover retaining finger structure 23 including out-turned retaining and reinforcing bead 24 for snap-on pry-off retaining engagement with and behind a radially inwardly projecting annular rib 25 on the intermediate flange 14 of the tire rim.

In order to afford access to the valve stem 18 while the cover 19 is on the wheel, the concave portion of the cover margin 21 is provided with a valve stem aperture 27 which in assembly of the cover with the wheel is adapted to be placed in alignment with the valve stem aperture 17 in the tire rim side flange 13. Thereby, the valve stem 18 will project through the aperture 27 for ready access by an air hose for inflating the tire 12.

Due to vibration and torque during rotation of the wheel in service there is a tendency for the cover 19 to move rotatably relative to the wheel. This is especially a problem where the retaining spring fingers 23 are used in conjunction with the annular cooperating rib 25 on the tire rim whereby the beads 24 on the retaining spring fingers engage behind the axially inner shoulder provided by the rib 25 and since only frictional resistance between the retaining finger beads and the rib would resist turning and in the presence of substantial torque such friction might be overcome. It will be understood that the amount of actual frictional engagement between the fingers and the rib is rather limited since there may be as few as four fingers equally spaced about the cover for retaining the same on the wheel. In the event the cover turns relative to the wheel the valve stem 18 will be bent, and possibly undesirably strained and in any event so distorted that access to the tip thereof would be decidedly cramped if not all together prevented.

According to the present invention means are provided for positively holding the cover against turning relative to the wheel, such means comprising a separately formed member 28 in assembly cooperating with the base portion of the valve stem 18 and with the cover 19 at the valve stem opening 27 to hold the cover against rotation so that the valve stem opening 27 will remain in substantially accurate registration with the valve stem. In preferred form, the turn preventing member 28 is in the form of a sleeve which may be made from sheet metal and of a diameter in the main body portion thereof to receive the body portion of the valve stem 18 fairly closely but nevertheless freely for longitudinal placement or removal of the sleeve relative to the valve stem in the placement or removal of the cover, but engageable with the valve stem upon any tendency of the cover to move transversely to the valve stem as in tendency toward rotary movement of the cover. The inner end of the sleeve 28 is preferably formed with a bell mouth 29 so as to facilitate passage of the sleeve over the valve stem and furthermore to direct the inner edge of the sleeve away from the valve stem so that there will be no direct edgewise engagement of the edge of the sleeve with the valve stem which might tend to cut the valve stem should the edge of the sleeve be rough or have burrs thereon or have a sharp corner since this might cut into the rubber body of the valve stem.

At its opposite or outer end, the turn-preventing sleeve 28 is formed with means for attachment to the wheel cover, herein comprising an inwardly offset shoulder 30 to engage against the axially inner side of the margin defining the valve stem aperture 27 of the cover and providing juncture for a reduced diameter neck or lip 31 of a diameter to fit through the stem aperture 27. The neck 31 is of greater length than the thickness of the material of the cover 19 so that after the neck 31 has been inserted through the aperture 27, as shown in Figure 5, the neck can be upset by crimping or spinning from the full outline position to the dash line position to form a retaining lip clampingly cooperating with the shoulder 30 to clamp the margin defining the aperture 27 against the shoulder 30 and thereby permanently securing the sleeve 28 to the cover.

It will be understood that modifications and variations may be effected without departing from the scope of the novel concepts of the present invention.

I claim as my invention:

1. In a wheel structure including a multi-flange tire rim and a load sustaining body part, the tire rim supporting a pneumatic tire assembly and having a valve stem projecting outwardly therefrom, a cover for concealing the outer side of the wheel and overlying the tire rim and having an aperture therethrough for passage of the valve stem, means on the cover for press-on, pry-off engagement with the wheel, and a member secured to the cover at said aperture and extending inwardly toward unattached adjacency to the tire rim to engage with the valve stem adjacent to the base of the latter for holding the cover against turning relative to the wheel.

2. In a wheel structure including a wheel body and a multi-flange tire rim having a pneumatic tire assembly thereon and including a side flange having a valve stem aperture therethrough and a valve stem projecting through said aperture, a cover for the outer side of the wheel including means retainingly engaging the tire rim in press-on, pry-off relation and the cover having a valve stem aperture therein arranged for alignment with the valve stem aperture in the tire rim so that the valve stem projects through the aperture in the cover, and a member engaging the cover at the margin defining the stem aperture in the cover and engaging about the body portion of the stem and by such engagement of the stem and the cover holding the cover against rotation relative to the wheel and thus against movement of the stem aperture in the cover out of registration with the stem aperture in the tire rim, said member comprising a sleeve carried by the cover and projecting inwardly about the valve stem free from any attachment to the tire rim.

3. In a cover for disposition at the outer side of a vehicle wheel and having an aperture therethrough for passage of a valve stem, means on the cover for press-on, pry-off engagement with the wheel, and a sleeve having a portion secured in functionally integral relation to the cover about the margin defining the valve stem aperture and extending behind the cover for engagement with the base of the valve stem to retain the cover against turning relative to a wheel upon which the cover may be mounted.

4. In a cover for disposition at the outer side of a vehicle wheel, a plurality of marginal cover retaining fingers having curled retaining beads adapted to engage a rib on a portion of the cover and subject to torque slippage so that the cover may turn on the wheel, the cover having a valve stem aperture therethrough, and a member for holding the cover against turning on the wheel comprising a portion engaging the cover at the stem aperture and another portion projecting rearwardly of the cover and engageable about the base portion of a valve stem to thereby hold the cover against turning and thus prevent bending of the valve stem.

5. In a cover for disposition at the outer side of a vehicle wheel, a plurality of marginal cover retaining fingers having curled retaining beads adapted to engage a rib on a portion of the cover and subject to torque slippage so that the cover may turn on the wheel, the cover having a valve stem aperture therethrough, and a member for holding the cover against turning on the wheel comprising a portion engaging the cover at the stem aperture and another portion projecting rearwardly of the cover and engageable about the base portion of a valve stem to thereby hold the cover against turning and thus prevent bending of the valve stem, said member comprising a sleeve having a reduced diameter neck portion crimped onto the margin defining the stem aperture.

6. In a cover for disposition at the outer side of a vehicle wheel, a cover body dimensioned to overlie the tire rim of a wheel and having means thereon for press-on, pry-off retaining engagement with the wheel but subject to torque slippage so that the cover may turn on the wheel in service, the cover body having a valve stem aperture therethrough, and a member for holding the cover against turning on the wheel comprising a portion engaging the cover body at the stem aperture and another portion projecting behind the cover and engageable about the base portion of the valve stem to thereby hold the cover against turning and thus prevent bending of the valve stem, said member comprising a sleeve having a portion interengaging the cover body at the edge defining said aperture and having at its distal end a bell mouth to facilitate slipping the sleeve over the valve stem in the application of the cover to a wheel.

7. As an article of manufacture, a cover for disposition at the outer side of the wheel comprising a cover portion having a valve stem aperture therethrough, a turn preventing sleeve body having an inner end for engagement about the base of a valve stem and a restricted opposite end affording a shoulder engaged against the inner side of the margin defining the aperture in the cover portion and a neck extending through the aperture and upset into gripping relation to the outer side of the margin defining the aperture.

8. In a wheel structure including a wheel having a laterally projecting valve stem on the outer side of the wheel, a cover for disposition on the outer side of the wheel and having an aperture therethrough for the passage of the valve stem, means on the cover for detachable press-on engagement with the wheel and a tubular-like portion having one end in integral relation with the cover about the valve aperture therein and having its other end extending behind the cover and of a configuration abuttingly cooperable with the base of the valve stem to retain the cover against turning relative to a wheel.

GEORGE ALBERT LYON.

References Cited in the file of this patent
UNITED STATES PATENTS

| Number | Name | Date |
|---|---|---|
| 1,858,663 | Frank | May 17, 1932 |
| 2,076,789 | Le Jeune | Apr. 13, 1937 |